United States Patent [19]

Mahefkey

[11] Patent Number: 4,813,476
[45] Date of Patent: Mar. 21, 1989

[54] EXPANDABLE PULSE POWER SPACECRAFT RADIATOR

[75] Inventor: Edward T. Mahefkey, Beavercreek, Ohio

[73] Assignee: The United States of America as represented by the Secretary of the Air Force, Washington, D.C.

[21] Appl. No.: 110,809

[22] Filed: Oct. 21, 1987

[51] Int. Cl.$^4$ ............................................. F28D 15/02
[52] U.S. Cl. ........................................ 165/32; 165/41; 165/46; 165/86; 165/104.26
[58] Field of Search ...................... 165/104.26, 46, 86, 165/41, 32; 244/163

[56] References Cited

U.S. PATENT DOCUMENTS 3,256,703  6/1966  Selwitz .................................. 165/46
3,399,717  9/1968  Cline .................................... 165/32

Primary Examiner—Albert W. Davis, Jr.
Attorney, Agent, or Firm—Donald J. Singer; Bobby D. Scearce

[57] ABSTRACT

An expandable heat rejection system for radiating heat generated by a source of heat on a spacecraft or like vehicle is described and comprises a fluid heat exchange medium in operative heat exchange contact with the source for absorbing heat by evaporation of the liquid phase of the medium, a thin flexible wall structure having an inlet and an outlet and defining a volume expandable and collapsible between preselected limits and defining an inner condensation surface and an outer heat radiating surface, a multiplicity of capillary grooves on the condensation surface for promoting condensation of vaporous medium and for facilitating flow of condensate along the condensation surface toward the outlet, and a pump for circulating the medium through the system.

5 Claims, 2 Drawing Sheets

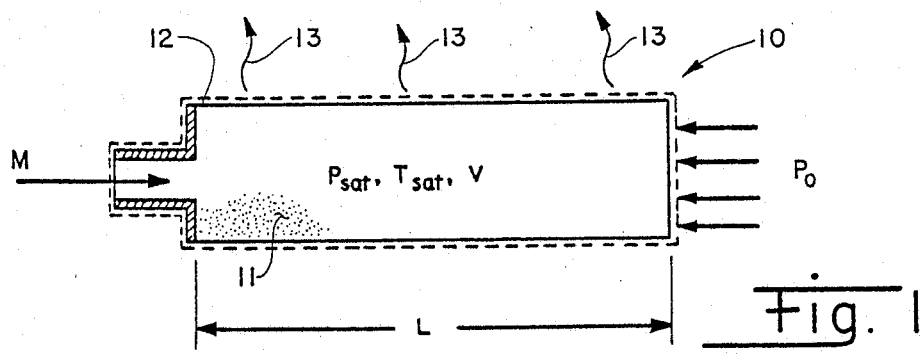
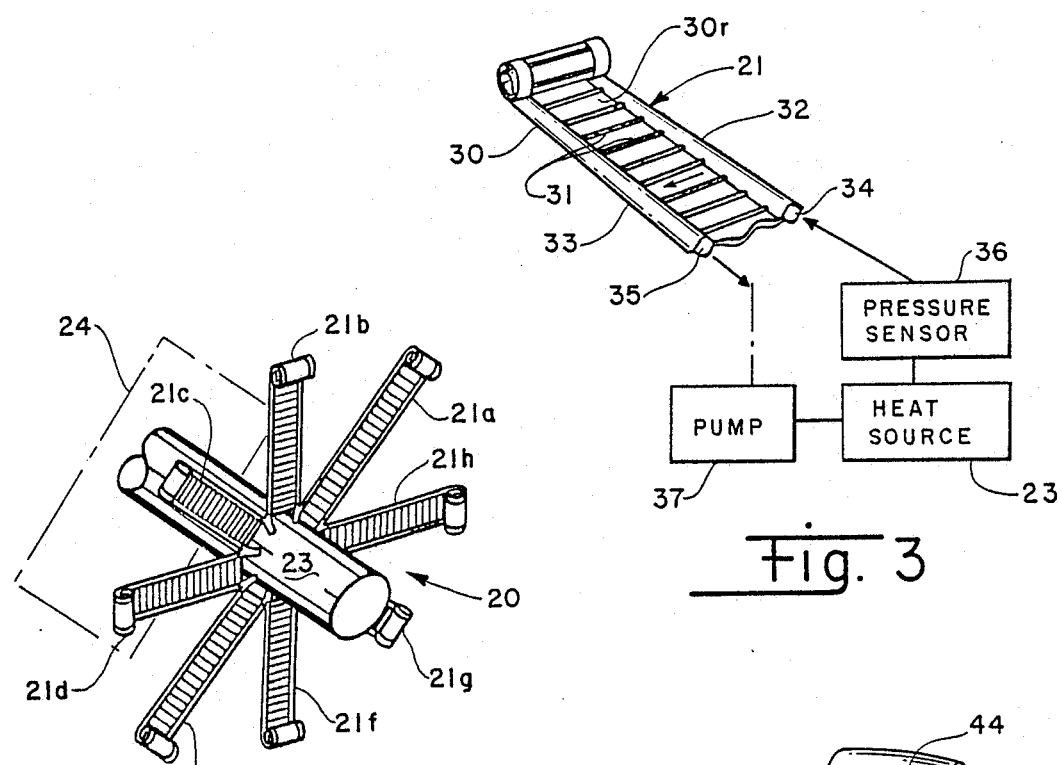
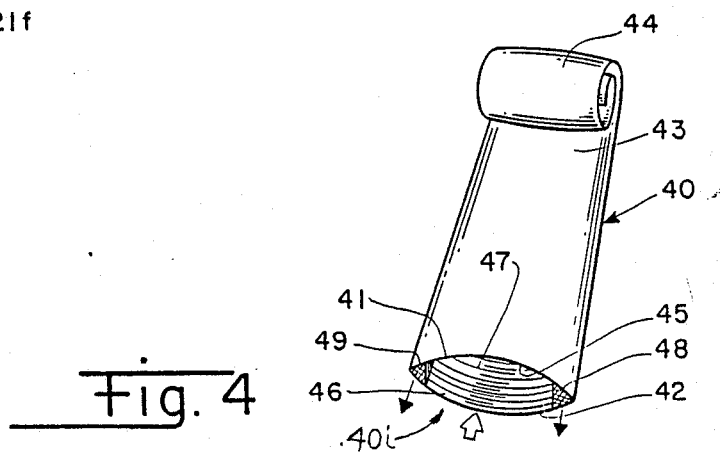

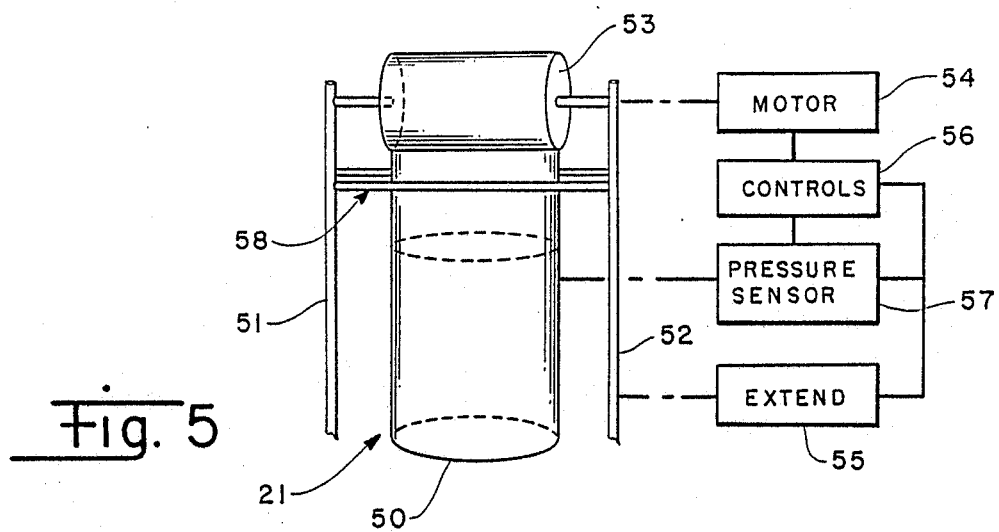
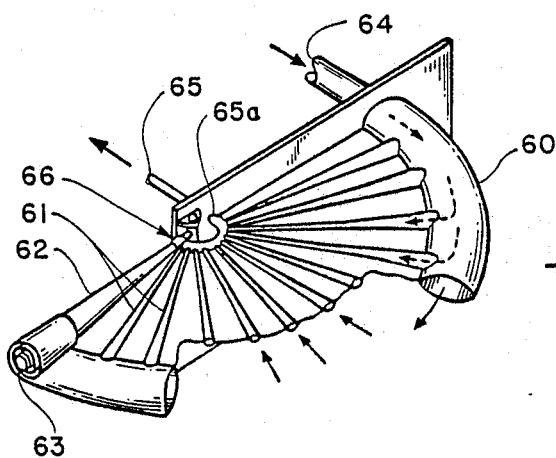
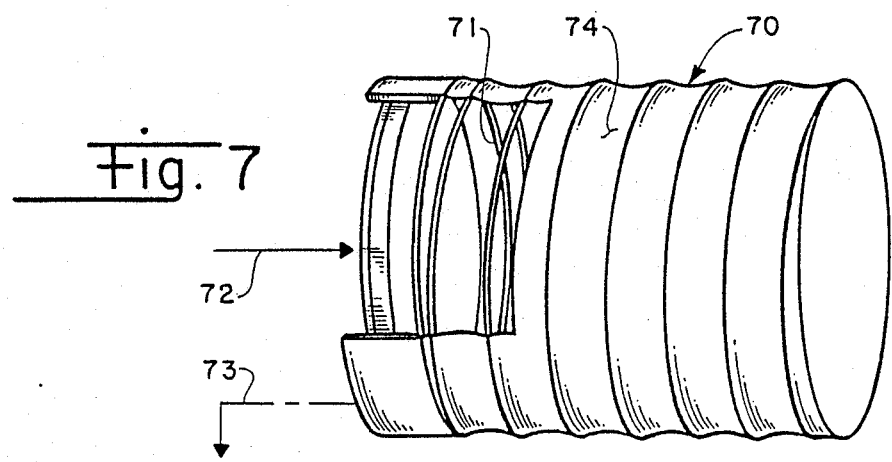

· 4,813,476

EXPANDABLE PULSE POWER SPACECRAFT RADIATOR

RIGHTS OF THE GOVERNMENT

The invention described herein may be manufactured and used by or for the Government of the United States for all governmental purposes without payment of any royalty.

BACKGROUND OF THE INVENTION

The present invention relates generally to systems for radiating heat from spacecraft or the like, and more particularly to a variable, deployable heat exchange radiator for a spacecraft providing high peak to average heat rejection.

The profile of a power demand duty cycle of a space mission may include periods of high power draw over short times interspersed with much longer periods when power is needed at only a low level. The pulse duration, amplitude and frequency are determined by mission applications. Conventional spacecraft radiators are sized to reject peak power waste heat loads, and turned down to reject power loads during off peak portions of a duty cycle. Conventional radiators are capable of near constant load thermal control over a range of nominally 10:1 peak to average heat loads for steady state heat rejection. However, for high power applications requiring high peak to average heat rejection capability wherein system weight is constrained, conventional radiator designs are of limited utility.

The present invention is a variable volume and surface area deployable heat exchange radiator utilizing a two-phase heat exchange system to take advantage of the high boiling heat transfer rate of a heat exchange medium at a heat source. The invention is characterized by a high condensation heat transfer rate inside the radiator, low operating fluid mass due to the large latent heat of vaporization, and high radiator effectiveness due to near isothermal operation. The invention stores substantially heat energy during a peak power load portion of the duty cycle for rejection of the stored heat during the off peak portion of the cycle. The invention is desirable for waste heat rejection where the peak to average heat generation is large, i.e., greater than about 5:1, and can be sized for average duty cycle heat rejection and storage of peak power spikes for dissipation during off peak periods. The invention may be selectively structured for an operating temperature of 300° K. (low temperature electronic cooling regime), to about 1000° K. (space power system heat rejection regime).

For modest peak to average (e.g., to about 100:1) heat loads, a high surface area to voluem rollout configuration is described. For higher peak to average ratios (e.g., to about $10^4$:1), an inflatable bag or bellows radiator structure having large volume to mass ratio is described. The radiator is constructed of low mass, thin flexible material which can be collapsed and stored, and which can be expanded readily when high peak power heat loads are imposed. The bellows structure can take in large amounts of vapor during the peak (pulse) portion of the duty cycle, and reject the waste heat through condensation and radiation during the off peak portions of the duty cycle. The invention therefore provides a light weight radiator which is compact and easily protected from micrometeroid impact except during peak expanded operation, and has minimum overboard contamination problems because the heat exchange medium is contained and recycled, rather than expelled overboard.

It is a principal object of the invention to provide a pulsed power heat rejection system for spacecraft or like vehicles.

It is a further object of the invention to provide a recycling heat rejection system having high peak to average heat rejection capability.

It is yet another object of the invention to provide a light weight, non-contaminating, expandable heat radiator having high peak to average heat rejection capability.

These and other objects of the invention will become apparent as the description of representative embodiments proceeds.

SUMMARY OF THE INVENTION

In accordance with the foregoing principles and objects of the invention, an expandable heat rejection system for radiating heat generated by a source of heat on a spacecraft or like vehicle is described and comprises a fluid heat exchange medium in operative heat exchange contact with the source for absorbing heat by evaporation of the liquid phase of the medium, a thin flexible wall structure having an inlet and an outlet and defining a volume expandable and collapsible between preselected limits and defining an inner condensation surface and an outer heat radiating surface, a multiplicity of capillary grooves on the condensation surface for promoting condensation of vaporous medium and for facilitating flow of condensate along the condensation surface toward the outlet, and a pump for circulating the medium through the system.

DESCRIPTION OF THE DRAWINGS

The invention will be more clearly understood from the following description of representative embodiments read in conjunction with the accompanying drawings wherein:

FIG. 1 is a schematic of a control volume illustrative of an expandable radiator of the invention;

FIG. 2 illustrates a rollout expandable configuration for moderate level peak to average heat rejection;

FIG. 3 is an illustration of one expandable arm of the FIG. 2 configuration;

FIG. 4 is a partial perspective view of an alternative expandable arm structure showing transverse capillary grooves on the condensing surface;

FIG. 5 shows a representative structure for extending the arms of the FIG. 3 embodiment;

FIG. 6 shows a fan shaped constant radius expandable rollout configuration; and

FIG. 7 shows an expandable bellows configuration for high level peak to average heat rejection.

DETAILED DESCRIPTION

Referring now to FIG. 1 of the drawings, shown therein is a schematic of an expandable/collapsible control volume 10 for the expandable radiator of the invention illustrating the geometry, mass flow, and heat transfer principles in the operation of the invention. The invention comprises a two-phase (liquid/vapor) heat transfer system utilizing the characteristic high latent heat of vaporization of a liquid heat exchange medium.

In the environs of outer space, a closed radiator system is required in order to conserve and recirculate the heat exchange medium, and excess heat Q may therefore be dumped only by radiation, governed by the familiar expression, $$dQ/dt = \epsilon \sigma A(T^4 - T_s^4)$$

where $\epsilon$ is the emissivity of the radiating surface, $\sigma$ is the Stephan-Boltzmann constant, A is the radiating surface area, and T is the absolute temperature of the radiating surface and $T_s$ the background temperature. A high average (and uniform) temperature over the radiating surface is therefore desired.

The background temperature of the near earth space environment varies with orbital position, but in orbits of interest may be shown to average about 250° K. Electronic components and solid state circuitry have representative mean time to failure of about $10^4$ hours at 475° K. which time reduces rapidly with increased temperature to about $10^2$ hours at about 575° K. Accordingly, for operating conditions for a radiator at heat rejection temperatures in the range of about 300°-400° K., water, ammonia, methanol and freons may be desirable as a heat exchange medium. For power system waste heat rejection in the high temperature (e.g., 400°-1000° K.) regime, liquid metals such as mercury, potassium, sodium and lithium and sodium-potassium eutectics (NaK) are suitable for use as the heat exchange medium.

Mass M of heat exchange medium flows into volume 10 (having variable volume V and length L) at a rate dm/dt proportional to the heat transfer rate and the enthalpy of evaporation of the heat exchange medium. The liquid/vapor medium 11 within volume 10 may be assumed to be saturated and transfers heat by convection and condensation to wall 12 defining volume 10. Vapor inside volume 10 is isothermal at the saturation temperature $T_{sat}$, and the expansion/contraction of volume 10 is isobaric at the saturation pressure $P_{sat}$, i.e., a constant external pressure $P_o$ is assumed to be reacting on volume 10 by reason of the structure defining volume 10. Radiation heat transfer (shown by lines 13) to space occurs from heated wall 12. The details of calculations for heat transfer utilizing the model presented in FIG. 1 is found in "Low Temperature Expandable Megawatt Pulse Power Radiator", by L. C. Chow, E. T. Mahefkey, and J. E. Yokajty, in Proceedings of the 1985 AIAA Thermophysics Conference (June 19-21, 1985).

The expandable radiator of the invention may assume any of several contemplated expandable/collapsible structures depending on the anticipated peak to average heat loads to be encountered. FIGS. 2-5 illustrate embodiments of the invention comprising high surface area to volume rollout structures. The embodiments of FIGS. 2-5 may be preferable for modest peak to average heat energy loads of from about 5:1 to about 100:1. In radiator system 20 of FIG. 2, any convenient plurality of radially extending extendable heat exchange arms 21a-h may be operatively attached to a source of heat 23 forming an integral part of a spacecraft or other vehicle 24 (represented by peripheral broken line) enclosing the systems from which heat is to be extracted for radiation from system 20. With reference now specifically to FIG. 3, each arm 21 may comprise a sleeve 30 of flexible film material supported by transverse structural elements 31, and having formed on the outer edges thereof fluid passageways 32,33 communicating respectively with inlet 34 and outlet 35 for passage of heat exchange medium into and out of sleeve 30. Passageways 32,33 communicate with each other across heat radiating surface area 30r of sleeve 30 wherein condensation of heat exchange medium and corresponding radiation of heat occurs in operation of the invention. Pressure sensor 36 for sensing pressure within sleeve 31 may be operatively connected to inlet 34 and to any mechanism included in system 20 for extension of arms 21 as discussed below in relation to FIG. 5. Pump 37 (suction, aspiration, or other suitable type) circulates heat exchange medium through arms 21 from heat source 23.

Referring now to FIG. 4, shown therein is a partial perspective view of an alternative expandable arm structure including means defined in the condensing surface for promoting the condensation of vaporous heat exchange medium and the flow of the condensate along the condensing surface. Accordingly, a representative expandable wall structure for a sleeve 40 may include a central inlet 40i for receiving vaporous heat exchange medium for condensation. A pair of liquid return channels 48,49 flank the vapor condensation region of sleeve 40 substantially as shown. Liquid return channels 48,49 may be in the form of passageways similar to those described in relationship to the FIG. 3 embodiment, or may contain wicking material to promote the the return flow of condensed heat exchange medium. Thin film walls 41,42 define the condensate region and liquid return channels of sleeve 40, and comprise a thin flexible film the respective outer surfaces 43,44 of which define the heat radiating surfaces of sleeve 40 for rejecting latent heat surrendered by condensation of vaporous heat exchange medium within sleeve 40; inner surfaces 45,46 define the surfaces upon which condensation of the heat exchange medium occurs. A multiplicity of capillary tubes, channels or grooves 47 (typically 0.005 inch grooves) on the inner surfaces 45,46 of walls 41,42 traverse sleeve 40 to maintain a liquid film inventory on inner surfaces 45, 46 and to assist in the flow of condensed heat exchange medium across sleeve 40 between passageways 48,49 as shown by the arrows in FIG. 3 or 4. The condensate collected on the condensing surfaces 45,46 of sleeve 40 (FIG. 4) or in area 30r (FIG. 3) is pumped from the collecting passageways 48,49 (FIG. 4) or 32 (FIG. 3) by pump 37, in the form of an aspiration pump or other suitable pumping means, in the recirculation of heat exchange medium to heat source 23.

In the operation of sleeve 40 for rejection of heat according to the teachings hereof, vapor flows into the condensation region of sleeve 40 as indicated by the large open arrow of FIG. 4, condenses on surfaces 45,46, and the condensate flows along grooves 47 normal to the vapor flow toward liquid return channels 48,49; liquid forms a fillet in the corner regions of the film structure defining sleeve 40 due to the small capillary radii in those areas which provides some driving force for the liquid flow to liquid return channels 48,49. The principles governing vapor condensation and liquid flow at the condensing surfaces of sleeve 40 may be extended in equivalent fashion to define flow of condensed heat exchange medium in other embodiments hereof.

Sleeve 30 comprises a light weight thin film material (selected according to the design heat rejection capacity and selected heat exchange medium) of elastomer, metal, composite reinforced elastomer or metal, prestressed metal foil, Kapton[R], Kevlar[R], plastic, rubber, metal/elastomer composite, fiber reinforced elastomer, or equivalent material of thickness typically from about two to about ten mils. Arms 21 may have an overall width of from about 1 to 10 meters and an extendable length of from about 10 to about 100 meters, depending on the design heat load. Each arm 21 may include two or more expandable sleeves (e.g., 30 or 40) formed or attached in side by side relationship and simultaneously extendable in order to provide a compartmentalized structure having desirable heat rejection capacity. Further, heat conducting fins may be attached to or integral with each extenable arm along the sides thereof in order to provide additional radiating surface area for the rejection of heat.

A model rollout configuration of the type described above in relation to FIG. 4 was constructed in demonstration of the invention. The demonstration model was about one meter long by four inches wide having a radiating surface of stainless steel foil about three mils thick with a heat exchange medium comprising water. The model functioned satisfactorily in radiating heat according to the governing principles of the invention.

Referring now to FIG. 5, shown therein is a representative mechanical structure for extending arm 21 for operating during peak heat load pulses to vehicle 24. Each arm 21 may be structurally supported radially outwardly of vehicle 24 and heat source 23 by a pair of spaced substantially rigid extendable booms 51,52. Arm 21 includes sleeve 50 such as any of those described above, and may be deployed radially outwardly or retracted using drum 53 supported between the distal ends of booms 51,52 and powered by motor 54. Extension means 55 for booms 51,52 and motor 54 may be controlled electrically through control means 56 and pressure sensor 57 with appropriate feedback represented by the connecting lines. A pair of rollers 58 may be supported between booms 51,52 as suggested in FIG. 5 to assist in deploying arm 21 and sleeve 50 and to define the operating volume and radiating surface area of arm 21, and further to squeeze liquid and vapor from sleeve 50 during retraction of arm 21. In an alternate passive deployment and retraction embodiment of the invention, each expandable sleeve of the embodiments of FIGS. 2-5 may define a prestressed, rollup or spring wound structure wherein the pressure of inflowing vapor overcomes the resiliency of the structure to deploy the sleeve. As condensation of vapor within the sleeve and accompanying heat rejection by the sleeve surface occur, pressure and temperature within the deployed sleeve reduce proportionally and the resiliency of the sleeve causes it to retract.

Referring now to FIG. 6, shown therein is an alternate configuration for deploying a sleeve 60 similar in structure to sleeves 30,50 of the FIGS. 2-5 embodiments. Sleeve 60 is supported on a structure including a plurality of spokes 61 and deployed or retracted in fan-like fashion from drum 63 or the like as boom 62 is rotated by centrally located motor and control mechanism 66. Inlet 64 communicates with sleeve 60 and is operatively connected to suitable pumping and control equipment in manner similar to the embodiment of FIG. 3. Spokes 61 may define liquid return conduits communicating with collector 65a and outlet 65 in the circulation of heat exchange medium.

Referring now to FIG. 7, shown therein is another embodiment of the radiator of the invention comprising an expandable bellows particularly suited for heat rejection at high peak to average heat load ratios up to about $10^4:1$. An extensible or inflatable bellows 70 having minimum surface area to volume ratio (i.e., larger diameter to length ratio) comprises a thin film of the material comprising sleeves 30,40,50,60 of the embodiments of FIGS. 2-6 and is supported on an extensible large compression helical spring 71 or other extensible support structure. Inlet 72 and outlet 73 of bellows 70 are operatively connected to pumping and control equipment similar to that depicted in FIG. 3 for the circulation of heat exchange medium. Wall 74 structure of bellows 70 has on the internal surface thereof capillary tubes, channels or grooves lengthwise of bellows 70 which define a condensation surface similar in structure to that depicted in FIG. 4. Bellows 70 may be deployed either by internal pressure of the system generated by evaporation of heat exchange medium at the heat source acting against the resiliency of spring 71, or by mechanical means operatively connected to bellows 70 for deployment thereof in manner similar to that depicted for sleeve 50 of FIG. 5. By reason of the resiliency of spring 71, bellows 70 will extend to an equilibrium position depending on the internal pressure of the system in manner similar to the prestressed structure described as an alternative embodiment to the FIG. 4 structure; as vapor condenses on the internal surfaces of bellows 70, spring 71 retracts bellows 70 and provides a positive force to recirculate the condensed heat exchange medium. In manner similar to that described in relationship to FIGS. 3 and 4, an aspiration pump or similar pumping means may be operatively connected to outlet 73 for removing condensed heat exchange medium from the inner surface of wall 74, since capillary pressure within the liquid return channels on the inner surface of wall 74 may be insufficient to provide a pressure head for return of condensed heat exchange medium. A pressure drop of less than one psi may ordinarily be needed at the pump to maintain the liquid return even at very high pulse power heat rejection levels. Alternatively, the bellows may be provided with a variable diameter so that $rdr/dx$ is constant, where r is the (variable) radius of the bellows and x a measure of extension of the length of the bellows, and, in conjunction with means to rotate the bellows (at a few rpm), the resulting component of the centrifugal acceleration acting on the condensate along the inner surface of the bellows assists in forcing the condensate toward the outlet for recirculation. To reject peak heat loads of about 5 $MW_t$, a three-meter diameter bellows 70 extendable to about 20 meters and presenting a radiating surface area of about 180 $m^2$ and utilizing about 110 kg of heat exchange medium (e.g., water) may be appropriate.

An important feature of the expandable, deployable radiator of the invention is that it can be compactly stowed and is subject to damage from micrometeoroid impact only when deployed for peak heat load operation (about 1/6 orbital time). Considering the near earth cumulative meteoroid flux, there is about a one percent chance for a three meter diameter by 100 meter long bellows to encounter a meteoroid of mass $10^{-5}$ gram or greater during one earth orbit; two encounters with micrometeoroids of mass $10^{-7}$ gram or less may be expected. A hole diameter caused by such an impact with a two mil surface structure is less than one millimeter and the resulting mass loss from a system containing several hundred kilograms of heat exchange medium (water) may be neglected. Freezing of condensed heat exchange medium in the vicinity of the hole may substantially reduce the effective hole size. If such losses are deemed unacceptable, a self sealing wall structure may be used, the structural details of which are outside the scope of these teachings.

For each expandable configuration described in the foregoing representative embodiments, a segmented or compartmentalized structure may be devised to reduce significantly the probability of substantial failure of an extended sleeve or bellows as a result of micrometeoroid impact. Such structures may include two or more sleeves joined side by side as suggested above in relation to FIG. 4, or a bellows having compartments in the shape of cylindrical sections having a common inlet along the axis of the bellows, or other modifications as would occur to the skilled artisan guided by these teachings, the same considered to be within the scope hereof.

The invention as hereinabove described therefore provides a novel heat rejection system for a spacecraft or similar vehicle. However, it is understood that structural materials, heat exchange medium and control equipment, and size and operating temperature for the extendable radiator of the invention may be selected in consideration of specific mission peak heat loads, exposure times, system weight constraints and other parameters, as determinable by one skilled in the applicable art guided by these teachings. Therefore, all embodiments contemplated hereunder which achieve the objects of the invention were not shown in complete detail. Other embodiments may be developed without departing from the spirit of the invention or from the scope of the appended claims.

I claim:

1. A heat rejection system for temporarily storing and radiating heat generated by a source of heat on a spacecraft or like vehicle, comprising:
   (a) a fluid heat exchange medium for contacting said source in operative heat exchange relationship with said source, said medium comprising a fluid material for absorbing heat by conversion of said medium from the liquid phase of said medium to the vapor phase of said medium;
   (b) a bellows defining a volume expandable and collapsible between preselected limits, said bellows having an inlet and an outlet and comprising a thin flexible wall having an inner surface defining a condensation surface for said medium and an outer surface defining a heat radiating surface;
   (c) means connected to said inlet for conducting said medium in said vapor phase from said source to said bellows;
   (d) a multiplicity of capillary grooves on said condensation surface of said thin flexible wall for promoting condensation of said heat exchange medium from said vapor phase to said liquid phase and for facilitating flow by capillary action along said condensation surface generally in a direction from said inlet toward said outlet of the liquid condensate formed by said condensation;
   (e) means communicating with said outlet for conducting said liquid condensate from said outlet into said heat exchange relationship with said source; and
   (f) pumping means for circulating said heat exchange medium through said system between said source and said bellows.

2. The heat rejection system as recited in claim 1 wherein said thin flexible wall of said bellows comprises a thin film of material selected from the group consisting of elastomer, metal foil, composite reinforced elastomer, composite reinforced metal foil, prestressed metal foil, plastic, rubber, metal/elastomer composite, and fiber reinforced elastomer.

3. The heat rejection system as recited in claim 2 wherein said thin film is from about two mils to about ten mils in thickness.

4. The heat rejection system as recited in claim 1 wherein said heat exchange medium comprises a material selected from the group consisting of water, ammonia, methanol, freon, mercury, potassium, sodium, lithium and sodium-potassium eutectic.

5. The heat rejection system as recited in claim 1 further comprising a spring operatively connected to said bellows for resiliently resisting expansion of said bellows in response to the pressure within said system generated by said conversion of said medium from said liquid phase to said vapor phase.

* * * * *